United States Patent [19]

Yamaguchi et al.

[11] Patent Number: 4,916,367

[45] Date of Patent: Apr. 10, 1990

[54] METHOD OF AND APPARATUS FOR PREVENTING SCANNING LINE DEVIATION IN A PROCESS SCANNER OF A SEPARATED DRUM TYPE

[75] Inventors: Takuya Yamaguchi; Osamu Kitagawa, both of Kyoto, Japan

[73] Assignee: Dainippon Screen Mfg. Co., Ltd., Japan

[21] Appl. No.: 270,228

[22] Filed: Nov. 14, 1988

[30] Foreign Application Priority Data

Nov. 14, 1987 [JP] Japan ................................. 62-286466

[51] Int. Cl.$^4$ ............................................. G05B 19/28
[52] U.S. Cl. ........................................ 318/60; 318/85; 318/603; 318/625; 355/47; 355/48
[58] Field of Search ................. 318/60, 62, 63, 66, 318/67, 68, 69, 71, 77, 85, 86, 375, 600, 601, 602, 603, 625; 355/47, 48, 24, 73, 74, 75, 104, 110, 213, 214, 233; 356/400, 401

[56] References Cited

U.S. PATENT DOCUMENTS

| | | | |
|---|---|---|---|
| 3,636,364 | 1/1972 | Stempler et al. | 318/85 X |
| 3,833,843 | 9/1974 | Bossons | 318/85 X |
| 3,997,828 | 12/1976 | Bottcher et al. | 318/603 |
| 4,601,568 | 7/1986 | Takano et al. | 355/233 |
| 4,722,061 | 1/1988 | Carlisle et al. | 318/564 X |
| 4,761,597 | 8/1988 | Sasaki et al. | 318/85 X |

*Primary Examiner*—William M. Shoop, Jr.
*Assistant Examiner*—Paul Ip
*Attorney, Agent, or Firm*—Ostrolenk, Faber, Gerb & Soffen

[57] ABSTRACT

An original drum and a recording drum are driven independently by individual synchronous motors. Encoders output respective rotation timing pulses ($P_a$, $P_b$) at every rotation of the recording drum and the original drum. If an interval separating the timing pulses ($P_a$, $P_b$) becomes smaller than a prescribed value, a scanning line deviation control circuit generates a motor control signal ($T_b$) which interrupts the delivery of electrical power to the faster moving motor for a limited period such as to restore a correct relationship between the timing pulses.

15 Claims, 5 Drawing Sheets

METHOD OF AND APPARATUS FOR PREVENTING SCANNING LINE DEVIATION IN A PROCESS SCANNER OF A SEPARATED DRUM TYPE

BACKGROUND OF THE INVENTION

1. Field of the Invention

The present invention relates to a method of and an apparatus for preventing scanning line deviation caused by a difference between respective rotational speeds of an original drum and a recording drum in a process scanner of a separated drum type, in which the original drum and the recording drum are driven separately by respective motors.

2. Description of the Prior Art

A so-called drum-type process scanner comprises an original drum on which an original is mounted to be read and a recording drum on which photo-sensitive material is mounted to be exposed. Drum type process scanners are usually classified into a common shaft type having a shaft common to both the original drum and the recording drum, and a separated shaft type (i.e., a separated drum type) having separated shafts for the original drum and the recording drum, respectively. Because a process scanner for scanning and recording a large-sized image must employ input and recording drums of large sizes which are difficult to be construct, and transport, set up, etc., the process scanner for large-sized images is mainly of the separated drum type.

In the process scanner of the separated drum type, the input and recording drums must be driven synchronously with the same rotational speed. Employed therefore are two equivalent synchronous motors rotating in synchronism with the frequency of the AC power driving the motors and two equivalent reduction transmission mechanisms for the respective original and recording drums. This serves to drive the original and recording drums with the same rotational speed.

When each of the reduction transmission mechanisms consists of a gear, a timing belt and the like which have no slip margin, the so-called slow start control under which driving motors are started at relatively low speed and accelerated gradually thereafter must be employed for driving large-sized heavy drums in order to mitigate mechanical shock to the reduction transmission mechanisms. Because the slow start control needs a complicated and expensive control circuit, a transmission mechanism, having a flat belt and a flat belt pulley, which causes little mechanical shock at starting operation, is employed in the process scanner with large-sized drums.

However, it is difficult to produce flat belt pulleys for the original and recording drums to have identical diameters, and therefore, differences between the rotational speeds of the original and recording drums are inevitable. Consequently, a phase difference between the respective rotations gradually changes in proportion to the continuation of the rotations.

In order to compensate for the discrepancies between the rotational speeds and to record a reproduced image which is faithful to the original image, image data obtained by scanning an original is temporarily stored in a memory means for each scanning line, and is then read out to a recording part of the scanner in accordance with rotational phase of the recording drum. Even then, if the phase difference of the rotations gradually changes out of an allowable range, a scanning line deviation finally occurs, and a part of the original image is missed or duplicated on the reproduced image, whereby the reproduced image does not conform to the original image.

Although the change of the phase difference is of small per one rotation cycle, it accumulates over in thousands of rotations during the time required for scanning the whole of the reproduced image. The sum of the differences can cause scanning line deviations.

SUMMARY OF THE INVENTION

The present invention is intended for a method of preventing a scanning line deviation on a recording drum of a process scanner, which scanning line deviation is caused by a change of a rotational phase difference between an original drum and the recording drum which are driven by respective motors.

According to the present invention, the method comprises the steps of: (a) comparing respective rotational speeds of the original drum and the recording drum, to classify the original drum and the recording drum into a faster drum rotating at a relatively fast speed and a slower drum rotating at a relatively slow speed, (b) determining allowable limits for a rotational phase difference between the faster drum and the slower drum, (c) detecting the rotational phase difference while rotating the faster drum and the slower drum with first and second motors, respectively, (d) comparing the rotational phase difference with the allowable limits, and (e) braking electric power supply to the first motor for a predetermined time period, when the rotational phase difference strays from the allowable limits.

Preferablly, the step (c) includes the steps of: (c-1) providing first and second encoders in the faster drum and slower drum, respectively, wherein the first encoder is operable to generate a first pulse at every rotation of the faster drum, and the second encoder is operable to generate a second pulse at every rotation of the slower drum, (c-2) detecting first and second timings at which the first and second pulses are generated, respectively, while rotating the first and second drums, and (c-3) determining the time span between the first and second timings, the time span indicating the rotational phase difference.

According to an aspect of the present invention, the first pulse is generated in series through continuous rotation of the first drum to form a first series of pulses, the second pulse is generated in series through continuous rotation of the second drum, to form a second series of pulses, and the time period is so determined as to satisfy a requirement that a sum of respective intervals between the first series of pulses during the time interval is larger than a sum of respective intervals between the second series of pulses during the time period.

The present invention also provides an apparatus for preventing a scanning line deviation on a recording drum of a process scanner, which scanning line deviation is caused by a change of a rotational phase difference between an original drum and the recording drum which are driven by respective motors. The apparatus comprises: (a) detecting means for detecting a rotational phase difference between respective rotational phases of the original drum and the recording drum, and (b) closed loop control means coupled to the detecting means and a power line for supplying electric power to the motors, for controlling power supply to one of the motors in response to the rotational phase difference detected by the detecting means, thereby to keep the rotational phase difference in predetermined allowable limits.

Since the electric power supply to the selected motor is broken if the rotational phase difference between the original and recording drum goes out of the allowable limits, the rotational phase difference is kept within the allowable limits to prevent the scanning line deviation.

Accordingly, an object of the present invention is to provide a method of and an apparatus for preventing a scanning line deviation in a process scanner of the separated drum type, even if a discrepancy between rotational speeds of original and recording drums exists.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
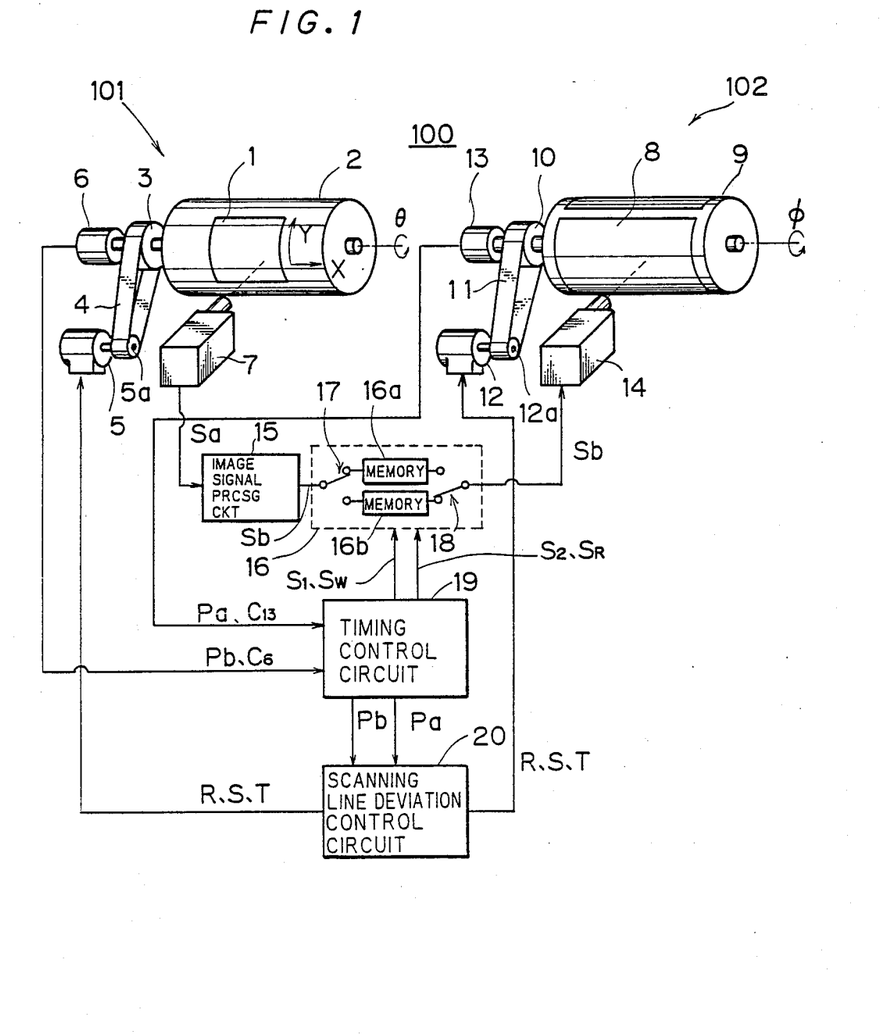
FIG. 1 is a block diagram showing the structure of a process scanner according to a preferred embodiment of the present invention.

FIG. 1 is a block diagram showing the structure of a process scanner according to a preferred embodiment of the present invention. The process scanner 100 comprises a reading part 101, a recording part 102 and electronic circuits 15-20. In the reading part 101, a flat belt pulley 3 is directly connected to a shaft of an input drum 2. The flat belt pulley 3 is also connected to another flat belt pulley 5a of a moter 5 through a flat belt 4, whereby the original drum 2 is rotated by the motor 5 in the direction $\theta$. A rotary encoder 6 is installed on the shaft of the original drum 2 to geneate one rotation timing pulse $P_b$ for each one rotation of the original drum 2, as well as a clock pulse $C_6$ for each small regular rotation of the original drum 2. The reading part 101 is also provided with a pickup head 7 which moves along the axial direction X of the original drum 2 to scan and read an original 1 mounted on the original drum 2 for each pixel while the original drum is rotating. A main scanning direction is defined by a circumferential direction Y which extends oppositely to the rotational direction $\theta$ of the original drum 2, and a subscanning direction is defined by the direction X. The pickup head 7 outputs a reading image signal $S_a$ to an image signal processing circuit 15.

The recording part 102, has a structure which is similar to the reading part 101, which comprises a recording drum 9 on which a photosensitive material 8 is to be mounted, a flat belt pulley 10, a flat belt 11, a motor 12, a rotary encoder 13, and a recording head 14. The recording head 14 emits a laser beam for exposing the photosensitive material 8 to produce a reproduced image thereon, on the basis of a recording image signal $S_b$. The recording image signal $S_b$ is obtained through prescribed processing, such as color correction, gradation correction and the like, which is effected, on the reading image signal $S_a$ in the image processing circuit 15, in a manner well known in the art.

The recording image signal $S_b$ is temporarily stored in a memory 16 for each main scanning line along the main scanning direction X in response to a writing control pulse $S_W$. The writing control pulse $S_W$ is generated in a timing control circuit 19 on the basis of accumulated counts of the clock pulse $C_6$, to be supplied to the memory 16. The memory 16 comprises two line memories 16a and 16b, each of which can store the image data expressed by the recording image signal $S_b$ for one main scanning line.

The line memories 16a and 16b are alternately connected to the image signal processing circuit 15 by a switching element 17 for storing the recording image data $S_b$.

The line memories 16a and 16b are also connected to the recording head 14 by a switching element 18. The recording image data $S_b$ is read out from the line memories 16a and 16b alternately, in turn to be transmitted to the recording head 14 in response to a reading control pulse $S_R$. The reading contol pulse $S_R$ is generated in the timing control circuit 19 on the basis of a clock pulse $C_{13}$ outputted from the rotary encoder 13. Namely, the recording image data $S_b$ is stored in the line memories 16a and 16b alternately for each main scanning line, and is read out from the same to produce a reproduced image on the photosensitive material 8.

Figure 2A:
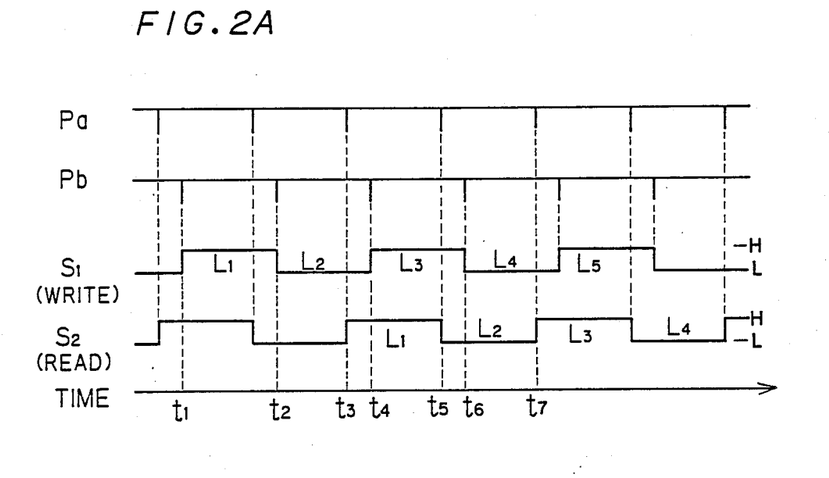
FIGS. 2A, and 2B are timing charts showing operation of the process scanner.
Figure 2B:
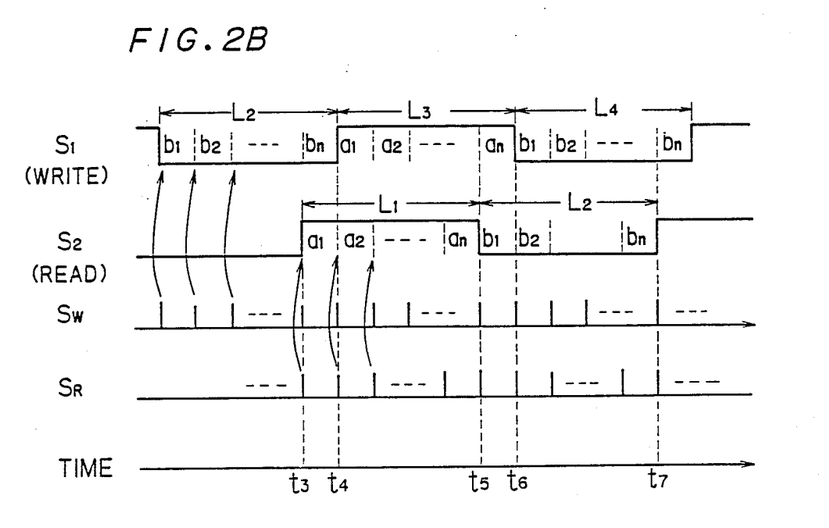

FIGS. 2A and 2B are timing charts showing the writing and reading operation of the memory 16. A switching signal $S_1$ generated in the timing control circuit 19 controls the switching element 17. The image signal processing circuit 15 is connected to the line memory 16a when the switching signal $S_1$ has an "H" level, and the same is connected to the line memory 16b when the switching signal $S_1$ has an "L" level. The level of the switching signal $S_1$ is alternated in response to the rotation timing pulse $P_b$ from the original drum 2. Another switching signal $S_2$ also generated in the timing control circuit 19 controls the switching element 18. The recording head 14 is connected to the line memory 16a when the switching signal $S_2$ has an "H" level and the same is connected to the line memory 16b when the switching signal $S_2$ has an "L" level. The level of the switching signal $S_2$ is so determined as to be changed to the opposite level from the current level of the switching signal $S_1$ when the rotation timing pulse $P_a$ from the recording drum 9 is supplied to the timing control circuit 19.

A recording image data for a main scanning line $L_1$ is written in the line memory 16a from time $t_1$ to $t_2$, and read out form time $t_3$ to $t_5$. Recording image data for the following main scanning lines $L_2, L_3\ldots$ are sequentially written in and read out from the line memories 16a and 16b on an alternating basis.

Although both switching elements 17 and 18 are switched to the line memory 16a from time $t_4$ to $t_5$ and to the line memory 16b from time $t_6$ to $t_7$, respectively, the recording of image data respective main scanning lines $L_1, L_2\ldots$ can be transmitted to the recording head 14. The reason for this is as follows. The line memories 16a and 16b have n sets of memory elements $a_1$-$a_n$ and $b_1$-$b_n$, respectively, where each of the memory elements is capable to store the recording image data with respect to one pixel. The timing the writing operation for each memory element is controlled by the writing control pulse $S_W$ which is generated in the timing control circuit 19 on the basis of the clock pulse $C_6$ from the rotary encoder 6. The timing of the reading operation for each memory element is controlled by the reading control pulse $S_R$ which is also generated in the timing control circuit 19 on the basis of the clock pulse $C_{13}$ from the rotary encoder 13. The writing operation is carried out on the memory element from which a recording image data previously stored has been already read out. The line memory 16a is accessed for both reading and writing operations in the time period $t_4$–$t_5$, while the other line memory 16b is accessed for both operations in the time period $t_6$–$t_7$. This causes no problem as long as the timing relationship between the signals $S_1$ and $S_2$ are so that each of the time spans $t_3$–$t_4$ and $t_5$–$t_6$ between the pulses Pa and Pb is longer than the time required for transmitting an image data for one pixel from or to a line memory. This is because the writing and reading access operations are directed to different memory elements at an arbitrary time as long as the above indicated condition holds true, as can be seen from FIG. 2B, and therefore, no conflict between the writing and reading operations occurs on each memory element.

The motors 5 and 12 of FIG. 1 are synchronous motors which rotate in synchronism with the frequency of AC power supplied from a common power source. If the ratio of the respective diameters of the flat belt pulleys 3 and 5a in the reading part 101 is the same with that of the corresponding flat belt pulleys 10 and 12a in the recording part 102, the respective rotational speeds of the original drum 2 and the recording drum 9 are the same. However, a discrepancy between the rotational speeds is bound to occur because of production errors in the pulleys.

Figure 3:
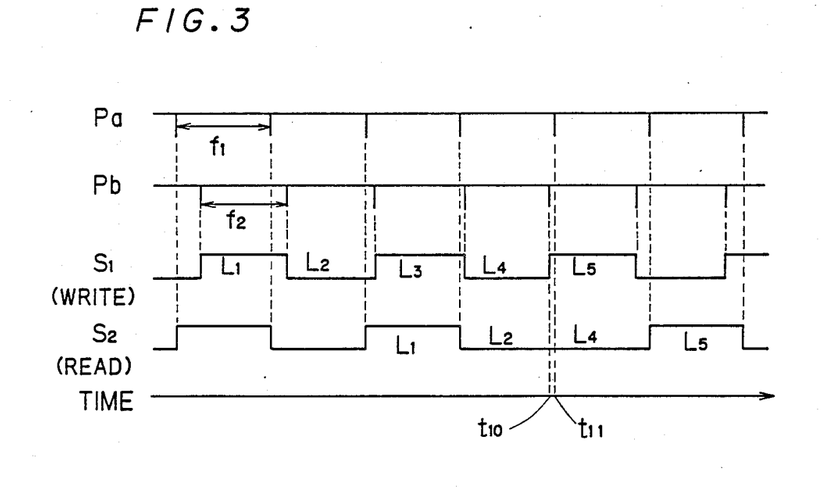

The discrepancy between the rotational speeds causes a change of the rotational phase difference between the original and recording drums. Although the change of the rotational phase difference is small per each rotation, it accumulates during scanning and recording of an entire reproduced image. This eventually causes a scanning line deviation on the reproduced image in a conventional process scanner which does not have a scanning line deviation control circuit 20. Details regarding the situation in a conventional scanner are as follows:

If the original drum 2 rotates faster than the recording drum 9, the recording image data $S_b$ of some main scanning line is written in the line memory 16a or 16b before the recording image data $S_b$ of another main scanning line which was previously stored is read out from the same line memory. Consequently, the recording image data $S_b$ previously stored is missed and is not recorded on the reproduced image. FIG. 3 is a timing chart showing the writing and reading operation which corresponds to the above case. Because the original drum 2 rotates faster than the recording drum 9, the period $f_2$ of the rotation timing pulse $P_b$ for the original drum 2 is shorter than the period $f_7$ of the rotation timing pulse $P_a$ for the recording drum 9. The time span between the rotation timing pulses $P_a$ and $P_b$ becomes gradually smaller, and the rotation timing pulse $P_b$ begins to appear prior to the timing pulse $P_a$ at a time $t_{10}$. Because the switching signal $S_1$ is at an "H" level at a time $t_{11}$ when the rotation timing pulse $P_a$ is inputted to the timing control circuit 19, the switching signal $S_2$ keeps at an "L" level at the time $t_{11}$, and thereby the recording image data for a main scanning line $L_3$ is missed so that it is not read out from the line memory 16a.

On the other hand, if the recording drum 9 rotates faster than the original drum 2, the recording image data $S_b$ of some main scanning line which was read out once is read out again from the line memory 16a or 16b before the recording image data $S_b$ of another main scanning line is written in the same memory element. Consequently, the recording data $S_b$ read out from the memory element is repeatedly recorded at adjacent main scanning lines on the reproduced image.

Figure 4:
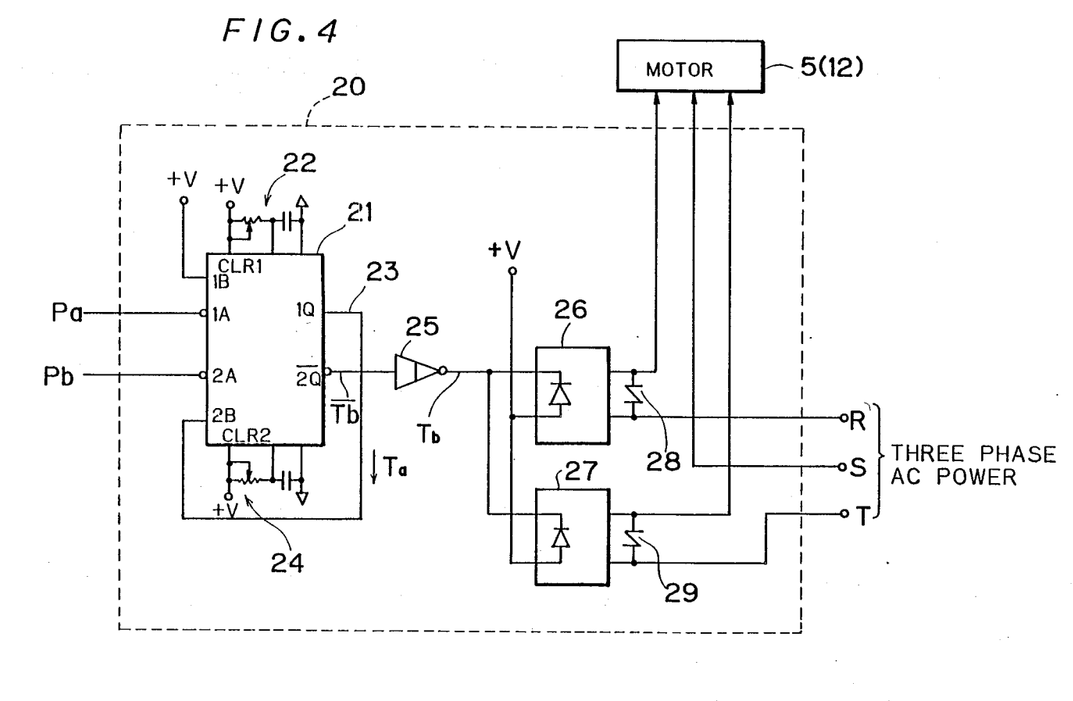
FIG. 4 is a block diagram which explain the a scanning line deviation control circuit of the preferred embodiment.
Figure 5:
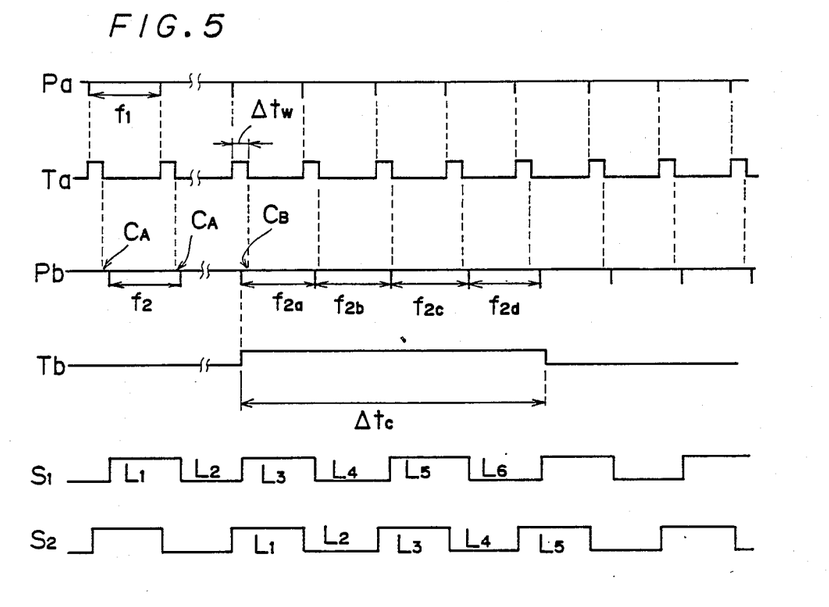
FIG. 5 is a timing chart showing the operation of the embodiment.

The process scanner 100 shown in FIG. 1 comprises the scanning line deviation control circuit 20 which serves to prevent the aforementioned scanning line deviation through the expedient of momentarily interrupting of the delivery of electric power to either of the motor 5 or 12 which drives the corresponding drum 3 or 9 faster than the other before the scanning line deviation occurs. As will be understood later, the scanning line deviation control circuit 20 functions as a closed loop control circuit for keeping the rotational phase difference between the drums 2 and 9 within allowable limits. FIG. 4 is a block diagram showing the internal structure of the scanning line deviation control circuit 20 and FIG. 5 is a timing chart illustrating its operation. Although the operation of the scanning line deviation control circuit 20 will be hereinafter described in the case where the original drum 2 rotates faster than the recording drum 9, it is to be noted that the present invention can be applied just as easily to the case where the recording drum 9 rotates faster than the original drum 2. That is the motors 5 and 12 in the following description are exchangeable. The respective rotation speeds of the drums 2 and 9 are first detected and compared with each other, whereby the faster drum is identified. The scanning line deviation control circuit 20 comprises an operation device 21 of MSI (for example, the "one shot" IC "SN74LS123" which is available Texas Instruments Inc.), an inverter 25 and SSRs (Solid-State Relay with zero-cross switch) 26 and 27. The respective rotation timing pulses $P_a$ and $P_b$ synchronizing the rotations of the recording drum 9 and the original drum 2 are supplied to input terminals 1A and 2A of the operation device 21, respectively. The operation device 21 comprises two monostable multivibrators (not shown). The first monostable multivibrator generates a reference period signal $T_a$ which remains "H" only for a reference period $\Delta t_w$, which is set up by a time-constant circuit 22 of the operation device 21, from the time when the rotation timing pulse $P_a$ is inputted to the operation device 21 as shown in FIG. 5. The reference period $\Delta t_w$ represents the allowable limits in the rotational phase difference, in the unit of time. The reference period signal $T_a$ is transmitted to an input terminal 2B of the operation device 21 through a connection line 23. The rotation timing pulse $P_b$ of the original drum 2 is inverted and inputted into the operation device 21 and then inputted to an AND circuit (not shown) in the operation device 21 with the reference period signal $T_a$. An output signal of the AND circuit becomes accordingly "H" when a rotational timing pulse $P_b$ of a "L" level is supplied to the operation device 21 while the reference period signal $T_a$ is "H". The second monostable multivibrator in the operation device 21 is triggered by the pulse rising edge in the output signal of the AND circuit, to raise its output signal $T_b$ to an "H" level. The signal $T_b$ holds the "H" level until a prescribed cut-off period $\Delta t_c$ passes from the trigger, where the cut-off period $\Delta t_c$ which is set up by a time-constant circuit 24 of the operation device 21. The signal $\overline{T}_b$ outputted from a terminal 2a of the operation device 21 is inverted by the inverter 25 and is transmitted to both zero-cross switches 26 and 27 ("TSS16J11S" of Toshiba Corp., Tokyo, Japan, for example) in parallel.

The zero-cross switches 26 and 27 are respectively inserted in two lines R and T out of three phase AC power supply lines R, S and T connected to the motors 5. Spark killers 28 and 29, well known in the art, are also inserted in the lines R and T in parallel to the zero-cross switches 26 and 27, respectively. The electric power supply to the motor 5 is accordingly suspended during the cut-off period $\Delta t_c$ in which the output signal $\overline{T}_b$ of the second monostable multivibrator holds its "L" level, that is, the output signal $T_b$ of the inverter 25 holds an "H" level as shown in FIG. 5. The rotational speed of the motor 5 is accordingly reduced during the cut-off period $\Delta t_c$. In other words, the power supply to the motor 5 is interrupted when the pulse $P_b$ is generated before the time period $\Delta t_w$ passes from the generation of the other pulse $P_a$.

In normal operation, the rotation timing pulse $P_b$ appears in a period in which the reference period signal $T_a$ is "L", as shown by condition $C_A$ in FIG. 5. Because the period $f_2$ is shorter than the period $f_1$, the rotation timing pulse $P_b$ gradually begins to appear earlier, thereby finally appearing in a period in which the reference period signal $T_a$ is "H", as shown by condition $C_B$ in FIG. 5. As a result, the motor control signal $T_b$ goes to "H" and holds the "H" level during the prescribed period $\Delta t_c$, thereby operating the SSRs 26 and 27 to break the electric power supply to the motor 5 during the period $\Delta t_c$.

Even when the electric power supply is suspended, the original drum 2 continues to rotate because of the inertia of the motor 5, the original drum 2 etc.. However, the rotational speed is gradually reduced. Assuming that periods of the rotation timing pulses $P_b$, while the electric power supply is cut off, are $f_{2a}$, $f_{2b}$, $f_{2c}$ and $f_{2d}$ in that order the following relation holds:

$$f_{2a} < f_{2b} < f_{2c} < f_{2d} \quad (1)$$

The period $\Delta t_c$ is so determined as to satisfy three requirements. The first requirement is that a sum of respective intervals between the series of the pulses $P_b$ during the period $\Delta t_c$ is larger than a sum of respective intervals between the series of the pulses $P_a$ during the period $\Delta t_c$. The first requirement can be expressed by the relation:

$$4f_1 < f_{2a} + f_{2b} + f_{2c} + f_{2d} \quad (2)$$

The second requirement is that the power delivery should resume after the time span between the pulses $P_a$ and $P_b$ is sufficiently increased. The time span between the pulses $P_a$ and $P_b$ corresponds to a rotational phase difference between the original drum 2 and the recording drum 9. In other words, the second requirement is that the power delivery should resume after the rotational phase difference is again within the allowable limits. If the power is reconnected under the condition that the time span between the pulses $P_a$ and $P_b$ is not sufficiently increased, the power would be stopped again just after it has been resumed, since the condition for raising the signal $T_b$ to an "H" level is still satisfied.

According to the second requirement, the period $\Delta t_c$ should be so determined that the pulse $P_b$ is generated out of the period in which the signal $T_a$ is in an "H" level, when the electric power delivery to the motor 5 is resumed after the period $\Delta t_c$.

Figure 6A:
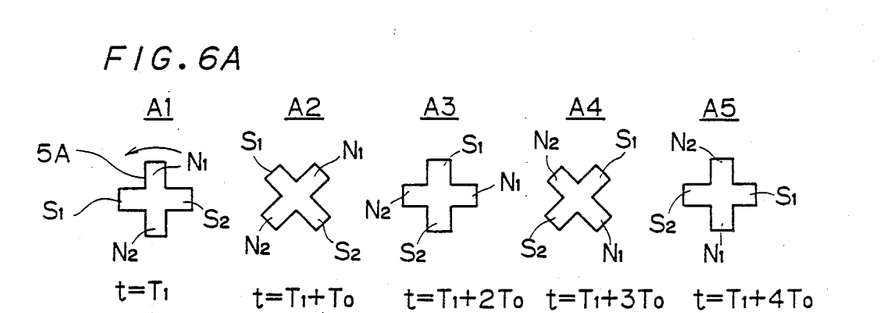
FIGS. 6A and 6B are an explanatory diagrams schematically showing the movement of rotors provided in motors.

The third requirement concerns phase matching between the motors 5 and 12 when the power is resumed. The details of this are as follows: The motor 5 resumes the drive with delayed rotational phase as compared with that before the power cut off. FIG. 6 is a diagram schematically showing movement of respective rotors in the motors 5 and 10, each of which is assumed to have four poles for example. The state A1 of FIG. 6A shows the rotor 5A of the motor 5 at its certain position in a rotation cycle while the motor 5 rotates in synchronism with AC power frequency. The rotor 5A rotates counterclockwise. The states A2 through A4 of FIG. 6A sequentially show the rotor 5A at the equivalent timings with the state A1, respectively, while the AC power is cut off. Namely, when the timing is expressed as $t = T_1$, the equivalent timings can be expressed as $t = T_1 + T_0$, $T_1 + 2T_0$, $T_1 + 3T_0$ and $T_1 + 4T_0$, respectively, where $T_0$ is (M/2) times of the alternate period of the AC power, where M is the number of poles of the rotor 5A.

Figure 6B:
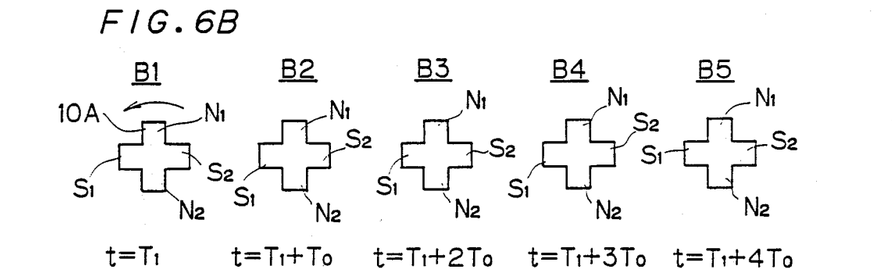

The rotor 5A rotates slower and thereby its rotational phase becomes gradually delayed at the equivalent timings. When the AC power is resumed after the cut-off period $\Delta t_c$, the rotational phase of the rotor 5A, which is shown as the state A5 in FIG. 6A, is delayed by one half of the rotation cycle in comparison with that shown as the state A1 in FIG. 6A. FIG. 6B shows the rotor 12A of the motor 12. The states B1 through B5 in FIG. 6B correspond to the states A1 through A5 in FIG. 6A, respectively. Because AC power supply to the motor 12 is not broken during the cut off period $\Delta t_c$, the motor 12 continues to drive the recording drum 9 in synchronism with the AC power frequency.

The rotational phase delay of the rotor 5A after the cut-off period $\Delta t_c$ must have one of the specific values, which are integral multiples of $(4\pi/M)$ radian, where M is the number of poles provided in each of the rotors 5A and 12A. For example, the phase delay should be selected from the values of $\pi$, $2\pi$, $3\pi$, ..., when the rotor 5A has four poles. The cut-off period $\Delta t_c$ is so determined that the the delay has one of the specific values in accordance with the number of poles in the motor 5 in consideration of moment of inertia of the transmission mechanism and the like. Namely, the greater the moment of inertia becomes, the longer the cut-off period $\Delta t_c$ is set. An example of characteristic values with respect to the motors 5 and 12, the transmission mechanism and the like are as follows:

AC power: 3 phase, 200 V, 60 Hz.
Motor type: synchronous motor with four poles.
Rotational frequency of motor: 1800 r.p.m.
Rotational frequency of original and recording drums: 750 r.p.m.
Reduction ratio of transmission mechanisms: 5:12.
Cut-off period $\Delta t_c$: 330 msec.
The cut-off period $\Delta t_c$ of 330 msec corresponds to ten rotation cycles of the motor 5. The amount of delay of the rotor 5A is accumulated to be $\pi$ radian or a half of a rotation cycle during the cut-off period $\Delta t_c$. The amount of delay of the original drum 2 corresponding to that of the rotor 5A is five over twenty four of a rotation cycle in consideration of the reduction ratio, since:

1/2×5/12=5/24 (of a rotation cycle)

The motor 5 operates in synchronism with the AC power and drives the original drum 2 faster than the recording drum 9 after the AC power is resumed. Therefore, the time span between the pulses $P_a$ and $P_b$ again starts to decrease, and, after a while, the rotation timing pulse $P_b$ begins to appear during the reference period $\Delta t_w$. In response to the pulse $P_b$ generated during the reference period $\Delta t_w$, the above stated process is repeated again. As a result, the original drum 2 and the recording drum 9 rotate while maintaining the rotational phase difference therebetween within a prescribed range. Thereby the scanning line deviation due to a change of the rotational phase difference is prevented.

The reduction of the rotational speed of the original drum 2 (or the recording drum 9) during the cut-off period $\Delta t_c$ does not influence the quality of a reproduced image because the recording image signal $S_b$ is controlled to be written in and read out from the memory 16 for each pixel by the writing and reading control pulses $S_W$ and $S_R$, respectively, which are given in proportional to the respective rotations of the drums 2 and 9.

Although the above explanation is intended for the case that the original drum 2 rotates faster than the recording drum 9, the present invention is also applicable to the contrary case, as already pointed out. However, it is easier to control rotational speed of the original drum 2 rather than the recording drum 9 because the original drum 2, which is usually made of plastics, has a smaller moment of inertia than the recording drum 9, which is usually made of metal. The original drum 2 is assured to be driven faster than the recording drum 9 by so setting the reduction ratio of the input drum 2 as to be smaller than that of the recording drum 9.

Although the scanning line deviation control circuit 20 consists of a MSI (medium scale integration) device and the like in the preferred embodiment, it can be composed of other types of devices and circuits.

According to the present invention, an original drum and a recording drum rotate while maintaining a rotational phase difference between themselves within a prescribed range even if there is a difference in rotational speeds. It is not necessary, therefore, to install reduction transmission mechanisms for original and recording drums so as to have the respective reduction ratios precisely equal to each other. Thus, a process scanner of a separated drum type can be easily produced at relatively low cost. Further, the cost of a scanning line deviation control circuit does not substantially influence the process scanner because it can be composed of a relatively simple operation devices and the like.

Although the present invention has been described and illustrated in detail, it should be understood that the same is by way of illustration and example only and is not to be taken by way of limitation, the spirit and scope of the present invention being limited only by the terms of the appended claims.

What is claimed is:

1. A method for preventing the development of scanning line deviations between independently driven first and second drums which are driven by respective motors, said method comprising the steps of:
   (a) comparing the rotational speeds of said first drum and said second drum and identifying the faster drum and the slower drum thereof,
   (b) defining an allowable range for a rotational phase difference between said faster drum and said slower drum,
   (c) repeatedly determining the actual magnitude of the rotational phase difference existing between said drums,
   (d) comparing said rotational phase difference with said allowable range,
   (d1) delivering electrical power to that one of said motors which drives said faster drum by means of a switch, and
   (e) interrupting the delivery of electric power to said one of said motors which drives the faster drum by opening said switch for a predetermined time period, when said rotational phase difference strays outside said allowable range.

2. A method in accordance with claim 1, wherein the step (c) includes the steps of:
   (c-1) providing first and second encoders in said faster drum and said slower drum, respectively, wherein said first encoder is operable to generate a first pulse at every rotation of said faster drum, and said second encoder is operable to generate a second pulse at every rotation of said slower drum,
   (c-2) detecting first and second timings at which said first and second pulses are generated, respectively, while said first and second drums are rotated, and
   (c-3) finding a time period between said first and second timings, said time period being indicative of said rotational phase difference.

3. A method in accordance with claim 2, wherein said first pulse comprises a series of first pulses generated by continuous rotation of said faster drum,
   said second pulse comprises a series of first pulses generated by continuous rotation of said slower drum, and
   said time period is so determined as to satisfy a first requirement that a sum of respective intervals between said first pulses during said time period is larger than a sum of respective intervals between said second pulses during said time period.

4. A method in accordance with claim 3, wherein said time period is so determined as to satisfy a second requirement that said delivery of electric power is resumed after said actual rotational phase difference is within said allowable range.

5. A method in accordance with claim 4, wherein said motors are synchronous motors and each has a respective rotor of M poles, where M is an integer, and
   said time period is so determined as to satisfy a third requirement that said delivery of electric power is resumed when said rotational phase difference becomes an integer multiple of $(4\pi/M)$ radians.

6. An apparatus for preventing the development of scanning line deviations between independently driven original and recording drums which are driven by respective motors, said apparatus comprising:
   (a) detecting means for detecting a difference in rotational phase between said original drum and said recording drum and for detecting a faster one of said drums,
   (b) a power source and switch means associated therewith for delivering electrical power to a given one of said motors which drives said faster drum and closed loop control means, coupled to said detecting means and to said switch means, for controlling said switch means to interrupt the supplying of power to said given one of said motors in response to said rotational phase difference in a manner which maintains said rotational phase difference within a predetermined allowable range.

7. An apparatus in accordance with claim 6, wherein one of said original drum and said recording drum rotates at a relatively faster speed, and a given one of motors drives said faster drum.

8. An apparatus in accordance with claim 7, wherein said closed loop control means includes:
(b-1) means for interrupting the flow of said power to said given motor for a predetermined time period.

9. An apparatus in accordance with claim 8, wherein said detecting means comprises:
(a-1) a first encoder associated with said faster drum to generate first pulses responsive to rotation of said faster drum,
(a-2) a second encoder associated with said slower drum to generate second pulses responsive to rotation of said slower drum, and
(a-3) means coupled to said first and second encoders for receiving said first and second pulses and for determining a time period between said first and second pulses, such that said time period indicates said rotational phase difference.

10. An apparatus in accordance with claim 9, wherein said closed loop control means further comprises:
(b-2) comparing means for comparing said time period with a predetermined reference time period corresponding to said allowable range, and
(b-3) means for activating said switch means when said time period exceeds said allowable range.

11. A method for preventing scanning line deviations between original recording drums which are independently and respectively driven by first and second motors, said method comprising the steps of:
detecting a difference in rotational phase between said original drum and said recording drum;
providing a source of electrical power for suppling electrical power to at least one of said drums through a switch means; and
controlling the supplying of electrical power to at least one of said first and second motors by controlling said switch means in a manner which maintains said difference in rotational phase within a predetermined allowable range.

12. The method of claim 11, wherein said controlling the supplying of electrical power comprises momentarily and occasionally interrupting the flow of electrical power to one of said motors.

13. The method of claim 11, wherein said controlling the supplying of electrical power includes generating first pulses representative of the rotational speed of said first motor, second pulses representative of the rotational speed of said second motor, and comparing said first pulses to said second pulses.

14. The method of claim 13, wherein each momentary interruption of the flow of electrical power endures for a predetermined duration, said predetermined duration being such that the sum of the respective intervals between the second pulses during the duration is larger than the sum of the intervals between the second pulses during the same duration.

15. The method of claim 14, wherein the comparing of said first and second pulses is carried out by means of at least one monostable multivibrator.

* * * * *